United States Patent
Drewes et al.

(10) Patent No.: US 7,426,097 B2
(45) Date of Patent: Sep. 16, 2008

(54) GIANT MAGNETORESISTIVE DEVICE WITH BUFFER-OXIDE LAYER BETWEEN SEED AND FERROMAGNETIC LAYERS TO PROVIDE SMOOTH INTERFACES

(75) Inventors: Joel Drewes, Boise, ID (US); William Witcraft, Minneapolis, MN (US)

(73) Assignee: Honeywell International, Inc., Morristown, NJ (US)

( * ) Notice: Subject to any disclaimer, the term of this patent is extended or adjusted under 35 U.S.C. 154(b) by 661 days.

(21) Appl. No.: 10/199,198

(22) Filed: Jul. 19, 2002

(65) Prior Publication Data

US 2004/0012895 A1    Jan. 22, 2004

(51) Int. Cl.
    *G11B 5/39* (2006.01)
(52) U.S. Cl. .............................. 360/324.12; 360/324.11
(58) Field of Classification Search ............... 360/324.1, 360/324.11, 324.12
    See application file for complete search history.

(56) References Cited

U.S. PATENT DOCUMENTS

| 5,701,223 | A | | 12/1997 | Fontana, Jr. et al. | |
|---|---|---|---|---|---|
| 5,768,071 | A | | 6/1998 | Lin | |
| 5,949,622 | A | * | 9/1999 | Kamiguchi et al. | 360/324.12 |
| 5,985,162 | A | | 11/1999 | Han et al. | |
| 6,052,262 | A | * | 4/2000 | Kamiguchi et al. | 360/324.12 |
| 6,141,191 | A | | 10/2000 | Lee et al. | |
| 6,171,693 | B1 | | 1/2001 | Lubitz et al. | |
| 6,208,492 | B1 | | 3/2001 | Pinarbasi | |
| 6,219,210 | B1 | * | 4/2001 | Pinarbasi | 360/324.11 |
| 6,292,336 | B1 | | 9/2001 | Horng et al. | |
| 6,303,218 | B1 | * | 10/2001 | Kamiguchi et al. | 360/313 |
| 6,404,606 | B1 | * | 6/2002 | Pinarbasi | 360/324.11 |
| 6,411,476 | B1 | * | 6/2002 | Lin et al. | 360/324.11 |
| 6,452,761 | B1 | * | 9/2002 | Carey et al. | 360/320 |
| 6,501,626 | B1 | * | 12/2002 | Gill | 360/324.11 |
| 6,770,382 | B1 | * | 8/2004 | Chang et al. | 360/324.12 |

FOREIGN PATENT DOCUMENTS

| EP | 0674327 A1 | | 9/1995 |
|---|---|---|---|
| JP | 2001230471 | | 8/2001 |
| JP | 20011230471 | A * | 8/2001 |

OTHER PUBLICATIONS

Zou, Wei, *Synthesis of Giant Magnetoresistive Multilayers*, May 2001.

* cited by examiner

*Primary Examiner*—Craig A Renner
(74) *Attorney, Agent, or Firm*—McDonnell Boehnen & Hulbert & Berghoff LLP (57) ABSTRACT

An enhanced giant magnetoresistive device, and a method of manufacturing the same. The enhanced giant magnetoresistive (GMR) device includes a substrate over which is formed a seed layer. A buffer-oxide layer is formed over the seed layer. Formed over the buffer-oxide layer is a GMR stack. The GMR stack is formed as a three layer sandwich in which the two outside layers are fabricated from ferromagnetic materials, and the inner layer or spacer layer is formed from non-magnetic, conducting materials. The GMR stack may also take the form of spin valves, and/or other GMR stacks. The buffer-oxide layer may be various thicknesses and provide desirable texturing or non-waviness, both of which may allow for a thin spacer layer. Further, the buffer-oxide layer may be configured to prevent Néel-type-orange-peel coupling from dominating RKKY coupling in the GMR device, which may allow for a thin spacer layer.

21 Claims, 6 Drawing Sheets

GIANT MAGNETORESISTIVE DEVICE WITH BUFFER-OXIDE LAYER BETWEEN SEED AND FERROMAGNETIC LAYERS TO PROVIDE SMOOTH INTERFACES

BACKGROUND

1. Field of the Invention

The present invention relates to giant magnetoresistive (GMR) devices that contain a GMR sensor element, which may be used in GMR sensors, spin valves, and magnetic memories. The present invention relates more particularly to a GMR device having enhanced magnetoresistive resistivity sensitivity, and a method of fabricating the same.

2. Description of Related Art

For over 2000 years, magnetic sensors have been beneficially deployed in navigation equipment for sensing the Earth's magnetic poles. Current magnetoelectronic devices may be used in medical applications for magnetic resonance imaging; in military surveillance for detecting submarines and buried landmines; in highway toll systems for traffic detection of vehicles for automated-toll-pay systems; in disk drives as magnetic pickup heads; in magnetoelectronics memories for Magnetic Random Access Memories (MRAM); and in automated industrial equipment for proximity sensors.

Magnetoelectronics devices may be used to measure the presence, magnitude, and/or direction of a magnetic field, changes in a magnetic field due to a presence of a ferromagnetic object, characteristics of the Earth's field, and electrical current flow. Many different types and constructions of magnetoelectronic devices exist. The types and constructions are generally dictated by the sensing technology, and the detectable magnetic field. Accurately and reliably measuring magnetic fields smaller than the Earth's field may present an obstacle for many magnetoelectronic devices, and thus, may limit the type and construction of the magnetoelectronic devices. One such device that appears to overcome these obstacles is a magnetosensor that employs the giant magnetoresistive (GMR) effect. Magnetosensors that employ the GMR effect may be capable of measuring small fields from magnetized objects, electrical currents, deviations in the Earth's magnetic field, and non-magnetized objects.

Reportedly, as a result of recent advances in the art of thin-film material processing, the giant magnetoresistive (GMR) effect was discovered in 1988 by Baibich et al. The GMR effect describes the phenomenon of dramatic resistance drop in certain materials in the presence of magnetic fields. This change in resistance divided by the total resistance of the GMR device may be defined as the magnetoresistive (MR) resistivity sensitivity of the GMR device.

At the core of many GMR magnetoelectronic devices is a GMR sensor element. The GMR sensor element may be used as the foundation for GMR magnetoelectronic devices, including unpinned sandwiches, antiferromagnetic multilayers, and antiferromagnetic pinned spin valves. Generally, this GMR sensor element is constructed in a stack configuration in which the stack contains a number of deposited layers of thin-film materials. Common to most GMR sensor elements, the minimum number of layers in the stack usually includes three layers—two magnetic layers separated by at least one conductive nonmagnetic spacer layer. It is believed that the MR resistivity sensitivity of the tri-layer and other multilayer stacks is a function of the thickness of the stack's spacer layers and the phenomenon of spin-dependent scattering of conduction electrons at the boundaries between the spacer layers and the magnetic layers.

In the absence of an external magnetic field, the magnetic layers in a tri-layer stack configuration may exchange magnetic coupling. This coupling may oscillate between ferromagnetically coupling and antiferromagnetically coupling, and may be partially modeled by Ruderman, Kittel, Kasuya, and Yosida theory of magnetic coupling (RKKY coupling).

The antiferromagnetic coupling is believed to cause the magnetic moments of the two magnetic layers to become antiparallel. In this antiparallel state, the stack of materials comprising the GMR sensor element is believed to exhibit maximum spin-dependent scattering of conduction electrons. The maximum spin-dependent scattering of conduction electrons in turn is believed to place the GMR sensor element in a maximum resistance state. By applying an adequate magnetic field to overcome the antiferromagnetic coupling, the antiparallel magnetic moments of the magnetic layers become parallel, thereby decreasing the spin-dependent electrons of the conduction electrons, and likewise, decreasing the resistance in the GMR magnetoelectronic devices. On the other hand, the ferromagnetic coupling is believed to cause the magnetic moments of the two magnetic layers to become parallel, which in turn is believed to exhibit something less than maximum spin-dependent scattering of conduction electrons or a lower resistance state.

Generally, as the spacer layer becomes thin, the MR resistivity sensitivity increases with a given oscillation period. That is, thinner spacer layers may produce larger peak antiferromagnetic coupling during an antiferromagnetic-coupling-oscillation period, and larger peak ferromagnetic coupling during a ferromagnetic-coupling-oscillation period. As the spacer layer thickness diminishes, however, defects in the stack's layers may occur due to processing. Such defects may present themselves as bridging sites or "pin-holes" that cause the magnetic layers to connect or "bridge" to each other, which may dramatically reduce or eliminate any GMR effect. In addition to pin-hole defects, the tri-layer stack may exhibit "waviness" or non-smooth layers. This waviness, non-smoothness or rough texturing is believed to affect the oscillation between the antiferromagnetic coupling and the ferromagnetic coupling, which may be reflected as a shift in the working range of the GMR sensor element. Further, it is believed that the non-smoothness or rough texturing may result in the GMR sensor element exhibiting Néel-type orange peel coupling in addition to the RKKY coupling. Generally, as the spacer layer thickness becomes thin, this Néel-type orange peel coupling may dominate the RKKY coupling causing a high ferromagnetic exchange between the magnetic layers, and causing a shift in the working range of the GMR sensor element to higher fields. Unfortunately, this shift may reduce or adversely affect the MR resistivity sensitivity of the GMR sensor element.

Therefore, what is needed is an enhanced GMR sensor element and method of manufacturing the GMR sensor element that allows for thin spacer layers and that minimizes, eliminates, or "fits" the Néel-type orange peel coupling generally accompanied with thin spacer layers. Further needed is an enhanced GMR sensor element and method of manufacturing the GMR sensor element that minimizes or eliminates an undesired shift in the working range of the GMR sensor element, thereby increasing its MR resistivity sensitivity as compared with un-enhanced GMR sensor elements.

SUMMARY

According to one embodiment, a giant magnetoresistive (GMR) device having an enhanced magnetoresistive (MR) resistivity sensitivity employs a buffer-oxide layer. An exemplary buffer-oxide layer may be fabricated from a group of metal oxides such as ferromanganese oxide, manganese-iridium oxide, and manganese-platinum oxide. The composition of an exemplary GMR device may also include (i) a substrate over which is formed (ii) a seed layer providing a base for the buffer-oxide layer, (iii) a first-ferromagnetic layer formed over the buffer-oxide layer, (iv) a spacer layer formed over the first-ferromagnetic layer, and (v) a second-ferromagnetic layer formed over the spacer layer. Sample materials for the buffer-oxide layer include metal oxide layers, such as ferromanganese oxide, a manganese-iridium oxide, and/or manganese-platinum oxide, and/or other oxidized antiferromagnetic materials that do not antiferromagnetically couple adjacent ferromagnetic layers.

BRIEF DESCRIPTION OF THE DRAWINGS

Preferred embodiments of the invention are described below in conjunction with the appended figures, wherein like reference numerals refer to like elements in the various figures, and wherein.

DETAILED DESCRIPTION OF EXEMPLARY EMBODIMENTS

1. Overview

An exemplary embodiment provides a giant magnetoresistive (GMR) device and method for manufacturing the same, in which the GMR device has an enhanced magnetoresistive (MR) resistivity sensitivity. The GMR device may achieve such enhanced MR resistivity sensitivity by employing a buffer-oxide layer in its composition. Generally, the composition and construction of the exemplary GMR device includes (i) a buffer-oxide layer over which (ii) a first-ferromagnetic layer is formed, (iii) a spacer layer formed over the first-ferromagnetic layer, and (v) a second-ferromagnetic layer formed over the spacer layer.

2. Exemplary Unpinned GMR Device Architecture

Figure 1:
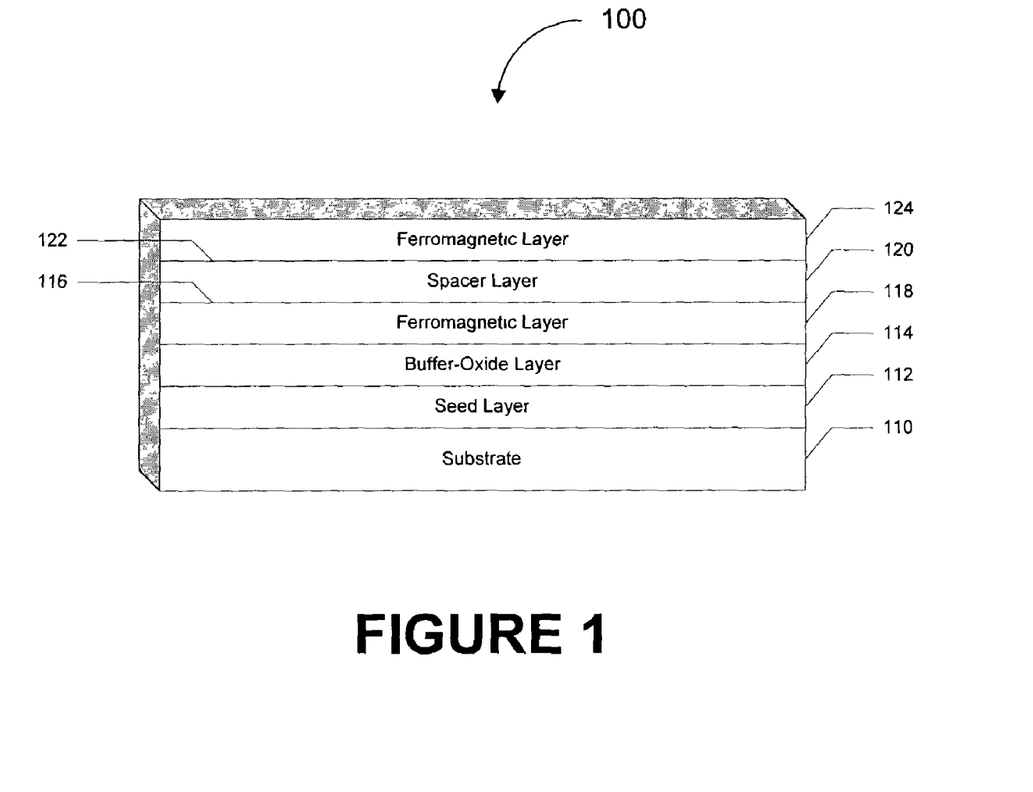
FIG. 1 is a cross-sectional view of a giant magnetoresistive sensor element according to an exemplary embodiment.

Referring to the drawings, FIG. 1 generally depicts an arrangement 100 for carrying out an exemplary embodiment. As shown in FIG. 1, the arrangement 100 illustrates an unpinned sandwich type GMR sensor element that includes a substrate 110, a seed layer 112, a buffer-oxide layer 114, a first-ferromagnetic layer 118, a spacer layer 120, and a second-ferromagnetic layer 124. As illustrated in arrangement 100, the second ferromagnetic layer 124 is formed over the spacer layer 120. The spacer layer 120 in turn is formed over the first-ferromagnetic layer 118. The first-ferromagnetic layer 118 is formed over the buffer-oxide layer 114, which is formed over the seed layer 112, and in turn over the substrate 110. Other arrangements are possible as well. FIG. 1 is not necessarily to scale.

The substrate 110 may be fabricated from non-magnetic ceramic materials including oxides, nitrides, borides, and carbides. The substrate 110 may also be fabricated from heterogeneous combinations and laminates of such non-magnetic ceramic materials. Additionally, homogenous combinations and laminates of the non-magnetic ceramic materials may be included in the substrate 110. Alternatively, the substrate 110 may comprise non-magnetic ceramic materials with an accompanying dielectric fabricated from metal or metallic oxides. Beyond ceramics, the substrate 110 may be fabricated from metals, such as an Aluminum Titanium alloy (Master AlTiC), polymers, and glass.

In yet another alternative, the composition of the substrate 110 may contain non-magnetic silicon material. In such case, the silicon material may be processed to form a dielectric. Consequently, the substrate 110 may include an insulating oxide layer such as silicon dioxide ($SiO_2$), Hafnium oxide (HfO), Tantalum oxide ($Ta_2O_5$), Titanium oxide ($TiO_2$) or other insulating oxide. In addition to the insulating oxide, the substrate may include an insulating or highly resistive nitride layer, such as silicon nitride ($Si_3N_4$), aluminum nitride (AlN), or Tantalum nitride (TaN). An exemplary substrate may be fabricated from a <100> orientation-P-type (e.g., Boron) bulk-silicon wafer over which is grown a layer of thermal oxide ($SiO_2$) at a thickness of not less than about 500 angstroms. Deposited over the thermal oxide is a layer of $Si_3N_4$ of a thickness of not less than about 500 angstroms. The thickness of the bulk silicon wafer, the thermal oxide layer, and $Si_3N_4$ layer, however, may vary.

Formed atop the substrate 110 is the seed layer 112, which may be fabricated from, but need not be limited to, one or more metals or metallic materials, one or more laminates of metal or metallic materials, one or more metal or metallic alloys, and/or one or more laminates of metal or metallic alloys. For example, the seed layer 112 may be fabricated from Tantalum (Ta), Tantalum Nitride (TaN), Hafnium (Ha), Zirconium (Zr), Rubidium (Ru) and/or any other metallic material or metal selected from Groups IVB-VIB of the Periodic Table of Elements. Depending on its makeup as well as many other parameters, the thickness of the seed layer 112 may be varied. Preferably, however, the thickness of the seed layer 112 may range from about 10 angstroms to about 100 angstroms, The seed layer 112 provides a base upon which the buffer-oxide layer 114 may be formed.

The buffer-oxide layer 114 may be fabricated from various metal or metallic oxides, or a combination of these metal or metallic oxides. By way of example, the buffer-oxide layer 114 may comprise a ferromanganese oxide (FeMnO), a manganese-iridium oxide (MnIrO), and/or manganese-platinum oxide (MnPtO). In an exemplary configuration, the ferromanganese oxide may be an amalgamation or compilation of $Fe_2O_3$/MnO and FeO/Mn. Alternatively, the buffer-oxide layer 114 may be fabricated from other oxidized antiferromagnetic materials that do not antiferromagnetically couple adjacent ferromagnetic layers. Paralleling the seed layer 112, the buffer-oxide layer may be fabricated from various thicknesses of such metal or metallic oxides. The thickness of buffer-oxide layer 114 fabricated from FeMnO, MnPtO, or MnIrO, however, may be the same, and range from about 2 angstroms to about 20 angstroms.

The first-ferromagnetic layer 118 may be formed over the buffer-oxide layer 114. Preferably, the first-ferromagnetic layer 118 is formed directly over the buffer-oxide layer 114. Like other layers in the GMR sensor element, the composition of the first-ferromagnetic layer 118 may be varied. Generally, the composition of the first-ferromagnetic layer 118 includes ferromagnetic materials such as cobalt ferromagnetic materials, nickel ferromagnetic materials, and/or iron ferromagnetic materials. Heterogeneous and homogenous amalgamations of such ferromagnetic materials may be included in the first-ferromagnetic layer 118 as well. These amalgamations may take the form of laminates, alloys, and laminates of alloys including nickel-iron alloy (NiFe) and laminates thereof, and cobalt-iron alloy (CoFe) and laminates thereof, nickel-iron-cobalt alloy (NiFeCo) and laminates thereof, cobalt-iron-boron alloy (CoFeB) and laminates thereof. An exemplary first-ferromagnetic layer 118 may be fabricated from a NiFe alloy (Permalloy) having a nickel:iron weight ratio from about 40:60 to about 90:10.

Again, paralleling the seed layer 114, the thickness of the first-ferromagnetic layer 118 may vary. This variation may depend on a multitude of factors. For instance, the thickness may depend on the desired amount of ferromagnetic coupling or antiferromagnetic coupling between the first-ferromagnetic layer 118 and the second-ferromagnetic layer 124, and/or the mechanical, chemical, and magnetic smoothness of the first interface 116 between first-ferromagnetic layer 118 and the spacer layer 120. Undertaking these considerations, the thickness of the first-ferromagnetic layer 118 comprised of Permalloy, formed over a 2-100 angstroms thick FeMnO buffer-oxide layer, may range from about 2 angstroms to about 100 angstroms.

The spacer layer 120 may be formed directly over the first ferromagnetic layer 118. A fabrication or diffusion barrier layer, as well as other beneficial layers, may be formed over the first-ferromagnetic layer 118, separating the spacer layer 120 from the first-ferromagnetic layer 118. The composition of the spacer layer 120 may include conductive non-magnetic materials, conductive paramagnetic materials, conductive diamagnetic materials, and/or other materials conventionally used in the fabrication of the spacer layer 120 in GMR devices. Exemplary materials may include copper, gold, aluminum, rubidium, and/or silver. In the composition of the spacer layer 120, these materials may be essentially pure (more than 98% pure) or take the form of amalgamations, alloys, laminates, and/or laminates of alloys. Preferably, the spacer layer 120 is fabricated from essentially pure copper.

In an exemplary construction, the thickness of the spacer layer 120 fabricated from copper may range from about 16 angstroms to about 60 angstroms, when formed over the first-ferromagnetic layer 118 comprising Permalloy and having a thickness of about 2 angstroms to about 100 angstroms. In other compositions, the thickness of the spacer layer 120 may vary. Although the buffer-oxide layer 114 may allow for a thin spacer layer 120, which may improve the MR resistivity sensitivity when compared to a GMR device without a buffer-oxide layer 114, the thickness of the spacer layer 120 may be substantially the same as in conventional GMR devices.

Formed over the spacer layer 120 is second-ferromagnetic layer 124. This second-ferromagnetic layer 124 is preferably formed directly over the spacer layer 120, thereby forming a second interface 122. Other beneficial layers, such as a fabrication-barrier layer, however, may be formed over the spacer layer 120 separating the second-ferromagnetic layer 124 from the spacer layer 120. In such a case, the second interface 122 is formed between the beneficial layer adjacent to the second-ferromagnetic layer and the second-ferromagnetic layer 124.

The composition of the second-ferromagnetic layer 124 generally includes materials known in the art of GMR devices. These materials may be ferromagnetic materials analogous and/or equivalent to the materials used to fabricate the first-ferromagnetic layer 118 including nickel, cobalt, and/or iron ferromagnetic materials. In addition to the substantially pure versions of such ferromagnetic materials, the second-ferromagnetic layer 124 may be fabricated from amalgamations, laminates, alloys, and/or laminates of alloys of ferromagnetic materials. As with the first-ferromagnetic layer 118, an exemplary second-ferromagnetic layer 124 may be fabricated from a NiFe alloy (Permalloy) having a nickel: iron weight ratio from about 40:60 to about 90:10.

Mirroring the first-ferromagnetic layer 118, the thickness of the second-ferromagnetic layer 124 may range from about from about 2 angstroms to about 100 angstroms. In an exemplary configuration, the thickness of the second-ferromagnetic layer 124 fabricated from Permalloy, which may be formed directly over spacer layer 118 comprised of Cu, may range from about 2 angstroms to about 100 angstroms. The thickness of the second-ferromagnetic layer 124 may vary in cross-section for Cu as well as for other fabrication-material types.

3. Exemplary Pinned GMR Device Architecture

Figure 2:
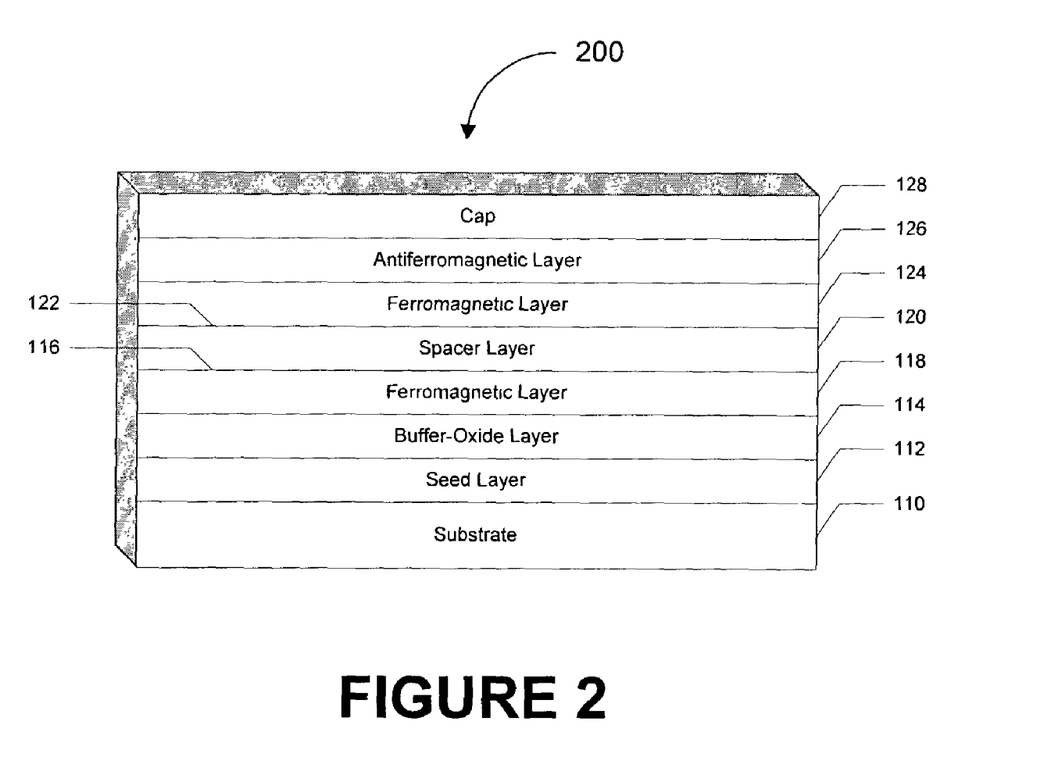
FIG. 2 is another cross-sectional view of a giant magnetoresistive sensor element according to an exemplary embodiment.

FIG. 2 generally depicts an arrangement 200 for carrying out an exemplary embodiment. As shown in FIG. 2, the arrangement 200 illustrates an exchange biased or "pinned" sandwich type GMR sensor element or GMR spin valve. Included in arrangement 200 are the substrate 110, the seed layer 112, the buffer-oxide layer 114, the first-ferromagnetic layer 118, the spacer layer 120, and the second-ferromagnetic layer 124 as illustrated in FIG. 100 and described above. Also shown in arrangement 200 are an antiferromagnetic layer 126, and cap layer 128.

As illustrated in arrangement 200, the antiferromagnetic layer 126 is formed over the second-ferromagnetic layer 124, and exchange biases or "pins" the magnetic moments of the second-ferromagnetic layer 124, thereby aligning the magnetic moments to that of the antiferromagnetic layer's 126 moments. Generally, the magnetic moments of the second-ferromagnetic layer 124 are pinned antiparallel to the magnetic moments of the first-ferromagnetic layer 118. The magnetic moments of the second-ferromagnetic layer 124 and the first-ferromagnetic layer 118, however, may be aligned in parallel.

The composition of the antiferromagnetic layer 126 may include exchange-biasing or pinning-material layers conventionally used in the art of GMR devices. Representative of these materials are antiferromagnetic-hard-magnetic-pinning versions of (i) FeMn alloys, (ii) NiO alloys, (iii) PtMn alloys, (iv) IrMn alloys, and (v) other higher-order alloys that incorporate alloys (i)-(iv). Other pinning materials may include a permanent-magnet-hard-magnetic-pinning version of a cobalt-platinum alloy, and/or other higher-order cobalt-platinum alloys. The antiferromagnetic layer 126 may also take the form of laminates, and laminates of alloys that amalgamate one or more of the group that includes a FeMn alloy, NiMn alloy, PtMn alloy, IrMn alloy, CoPt alloy, and/or other higher-order version of such alloys. An exemplary antiferromagnetic layer 126 may be fabricated from a FeMn alloy having a Fe:Mn weight ratio from about 40:60 to about 60:40.

As with the rest of the layers, the thickness of the antiferromagnetic layer 126 may vary not only in layer cross-section for FeMn but also for other antiferromagnetic layer composition materials. Exemplary thicknesses of the antiferromagnetic layer 126 may range from about 70 angstroms to about 150 angstroms for a composition from about 40:60 to about 60:40 of FeMn by weight. Alternatively, the thickness of the antiferromagnetic layer 126 may range from about 70 angstroms to about 200 angstroms for a composition from about 17:83 to about 22:78 of IrMn by weight, and may range from about 100 angstroms to about 250 angstroms for a composition from about 30:70 to about 40:60 of PtMn by weight.

Also included in the arrangement 200 is a cap layer 128, which may be fabricated from conductive non-magnetic materials, conductive paramagnetic materials, conductive diamagnetic materials, and/or materials conventionally used in the fabrication of the spacer layer 120 in GMR devices. This cap layer 128, however, may be fabricated from higher resistivity materials to limit current shunting through the cap layer 128. In this case, the cap layer 128 may be fabricated from the type of materials used in fabricating the seed layer 112, including essentially pure Ta, Hf, and Zr, or amalgamates, laminates, alloys, and laminates of alloys of Ta, Hf, and/or Zr. An exemplary cap layer 128 may be fabricated from essentially pure Ta having a thickness not less than 10 angstroms.

4. Process for Manufacturing a GMR Device

Figure 3:
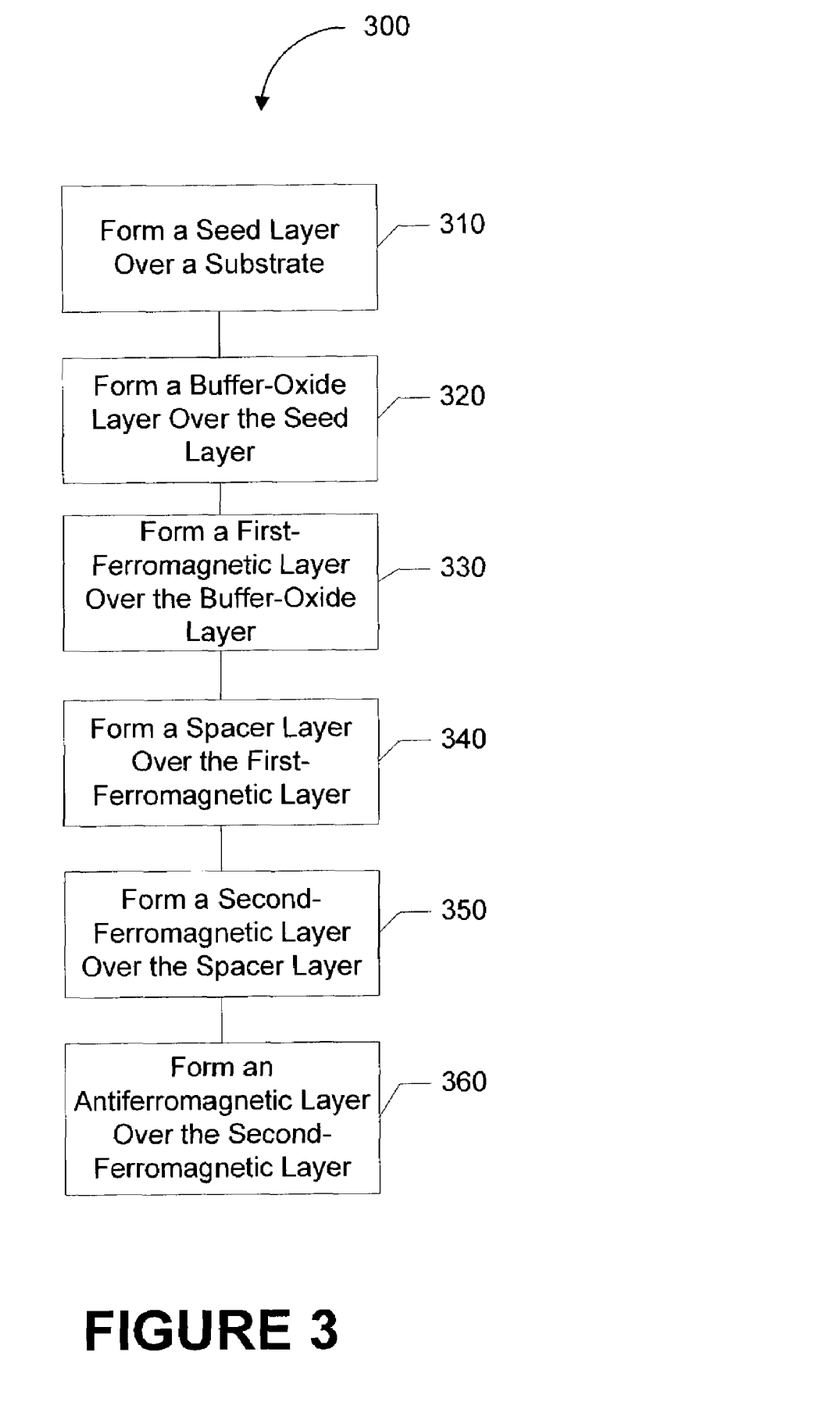
FIG. 3 is a flow chart illustrating a process for manufacturing a giant magnetoresistive sensor element according to an exemplary embodiment.

Referring now to FIG. 3, a simplified flow chart 300 is provided depicting an exemplary process for manufacturing a GMR sensor element The exemplary process includes (i) forming a seed layer over a substrate, (ii) forming a buffer-oxide layer over the seed layer, (iii) forming a first-ferromagnetic layer over the buffer-oxide layer, (iv) forming a spacer layer over the first-ferromagnetic layer, (v) forming a second-ferromagnetic layer over the spacer layer, and (vi) forming an antiferromagnetic layer over the second-ferromagnetic layer.

Block 310 shows the function of forming a seed layer over a substrate. This function may be carried out by forming or depositing a layer of Ta, Ha, Zr, TaN, Ru and/or any other metallic material or metal selected from Groups IVB-VIB of the Periodic Table of Elements over a substrate. In an exemplary configuration, the substrate is formed from <100> orientation P-type (e.g., Boron) doped silicon wafer having a thermally grown $SiO_2$ layer, and sputtered $Si_3N_4$ layer formed over the thermal oxide layer.

Depositing the layer of metallic material or metal may be carried out using one or more of known vapor deposition techniques. These vapor deposition techniques may include chemical vapor deposition (CVD), such as low-pressure CVD (LPCVD); and physical vapor deposition (PVD), such as molecular beam epitaxy (MBE), RF-Diode sputtering, Magnetron sputtering, and/or Ion Beam Assisted Deposition or Ion Beam Deposition (IBD).

In forming the seed layer over the substrate, the seed layer may be fabricated from a Ta target using the IBD process to form a layer of Ta having a thickness from about 10 angstroms to about 100 angstroms. As known in the art of IBD processing, a number of IBD process parameters are used to control or facilitate the deposition of metals and other materials. The IBD process parameters for producing a seed layer of Ta may include (i) a seed-layer-deposition pressure parameter, (ii) a seed-layer-deposition ion energy parameter, (iii) a seed-layer-deposition ion-incident-angle parameter, and (iv) a seed-layer-deposition temperature parameter. In an exemplary embodiment, the values of the seed-layer-deposition pressure may range from about 1.00 E-05 Torr to about 4.00 E-04 Torr; the values of the seed-layer-deposition ion energy may range from about 300 eV to about 1.1 KeV; the values of the seed-layer-deposition ion-incident-angle may range from about 0 degrees to about 60 degrees off the substrate target; and the values of the seed-layer-deposition temperature may range from about 0 degrees C. to about 80 degrees C. The values of the process parameters may vary from those presented. In addition to the IBD process parameters presented, other IBD process parameters for forming the Ta or other material seed layer over the substrate thickness are possible.

Forming a buffer-oxide layer over the seed layer, as shown in block 320, may be performed by a vapor deposition process in which an antiferromagnetic-material target is processed using in situ, atmospheric, and/or plasma oxidation to produce a layer of buffer-oxide material at a thickness from about 2 angstroms to about 100 angstroms. An IBD process using a target having a Fe:Mn weight ratio of about 50:50 together with in situ oxidation provides exemplary results. Other targets having different Fe:Mn weight ratios may be used. For example, the Fe:Mn weight ratio may range from about 40 to 60 iron, with the remainder being substantially manganese. While an exemplary target is essentially pure FeMn alloy, in any of these cases, the FeMn target may contain other materials. Moreover, other target materials, such as target materials fabricated from essentially pure and/or amalgamations of primarily IrMn alloys and PtMn alloys, may be used.

Analogous to the process parameters used in depositing the seed layer over the substrate, the IBD parameters used for depositing the buffer-oxide layer over the seed layer may include (i) an oxide-layer-deposition pressure parameter, (ii) an oxide-layer-deposition ion energy parameter, (iii) an oxide-layer-deposition ion-incident-angle parameter, and (iv) an oxide-layer-deposition temperature parameter. To produce a layer of FeMnO having a thickness from about 2 angstroms to about 100 angstroms, the values of the oxide-layer-deposition pressure may range from about 1.00E-05 Torr to about 4.00E-04 Torr. Further, the values of the oxide-layer-deposition ion energy may range from about 300 eV to about 1.1 KeV. In addition to the other parameters, exemplary results may be obtained when the values of the oxide-layer-deposition ion-incident-angle may range from about 0 degrees to about 60 degrees off the substrate target, and when the values of the oxide-layer-deposition temperature may range from about 0 degrees C. to about 60 degrees C. The values of the IBD process parameters for forming the buffer-oxide layer may vary from those presented. Additionally, other IBD process parameters may be included.

During the deposition of the buffer-oxide layer, the IBD (or other deposition process) deposited material of the buffer-oxide layer (e.g. FeMn) undergoes in situ oxidation in which the deposited material is subjected to oxygen for a period of no less than about 1 minute at a pressure of about 1.00E-04 Torr. In an alternative process, the IBD (or other deposition process) deposited material may be oxidized using oxygen plasma. In addition to using oxygen as an oxidizer, various other gases or targets may be used. For example, ozone $O_3$, $N_2O$, and the oxide of FeMn(Ox) as pressed target may be used.

At block 330, forming a first-ferromagnetic layer over the buffer-oxide layer may be performed by depositing a layer of ferromagnetic material directly over the buffer-oxide layer using various vapor deposition processes. Alternatively, the first-ferromagnetic layer may be deposited over an intermediate layer, such as a fabrication-barrier layer, located between the buffer-oxide layer and the first-ferromagnetic layer. As with other layers forming the GMR sensor element, the first-ferromagnetic layer may be deposited by CVD and/or PVD, or other deposition technique.

In particular, the first-ferromagnetic layer fabricated from NiFe alloy, CoFe alloy or any other ferromagnetic material may be deposited using an IBD process controlled by process parameters so that the first-ferromagnetic layer achieves a thickness from about 2 angstroms to about 100 angstroms. The process parameters for depositing the first-ferromagnetic layer may include (i) a ferromagnetic-layer-deposition pressure parameter, (ii) a ferromagnetic-layer-deposition ion energy parameter, (iii) a ferromagnetic-layer-deposition ion-incident-angle parameter, and (iv) a ferromagnetic-layer-deposition temperature parameter.

In producing an exemplary first-ferromagnetic layer, the ferromagnetic-layer-deposition pressure may range from about 1.00E-05 Torr to about 4.00E-04 Torr. Similarly, the ferromagnetic-layer-deposition ion energy parameter may range from about 300 eV to about 1.1 KeV. An exemplary range for the ferromagnetic-layer-deposition ion-incident-angle is from about 0 degrees to about 60 degrees. Exemplary temperatures for the ferromagnetic-layer-deposition temperature parameter may range from about 0 degrees C. to about 80 degrees C. The values of the IBD process parameters for forming the first-ferromagnetic layer may vary from those presented. Additionally, other IBD process parameters may be included in performing the function of forming the first-ferromagnetic layer.

At block 340, forming a spacer layer over the first-ferromagnetic layer may be carried out using various known vapor deposition processes. In an exemplary embodiment, the spacer layer is formed directly over the first-ferromagnetic layer. In another exemplary embodiment, a buffer layer may be formed directly over the first-ferromagnetic layer, separating the spacer layer from the first-ferromagnetic layer. In any case, forming the spacer layer may be performed by depositing a layer of conductive, non-magnetic material using CVD or PVD. The spacer layer, which may be fabricated from essentially pure Cu or some amalgamation of Cu, may be deposited using an IBD process so that the spacer layer achieves a thickness from about 16 angstroms to about 60 angstroms.

As with other IBD depositions, in controlling the IBD process to achieve an exemplary spacer layer, each of the IBD process parameters may be set to a particular range. Included in the process parameters for depositing the spacer layer by IBD are (i) a spacer-layer-deposition pressure parameter, (ii) a spacer-layer-deposition ion energy parameter, (iii) a spacer-layer-deposition ion-incident-angle parameter, and (iv) a spacer-layer-deposition temperature parameter.

The IBD process parameter values for producing the exemplary conductive, non-magnetic spacer layer having a thickness from about 16 angstroms to about 60 angstroms using a Cu target may vary. In one of these variations, the spacer-layer-deposition pressure may range from about 1.00E-05 Torr to about 4.00E-04 Torr, and the spacer-layer-deposition ion energy parameter may range from about 300 eV to about 500 eV. The range of exemplary angles for the spacer-layer-deposition ion-incident-angle may include angles from about 0 degrees to about 60 degrees. In the same way, an exemplary range of temperatures for the spacer-layer-deposition temperature parameter may be from about 0 degrees C. to about 80 degrees C. As with other IBD processes used in forming the GMR sensor element, alternative and additional IBD process parameters may be included in forming the spacer layer over the first-ferromagnetic layer.

At block 350, forming a second-ferromagnetic layer over the spacer layer may be performed in the substantially similar way as forming the first-ferromagnetic layer over the buffer oxide layer. In so doing, a layer of ferromagnetic material may be deposited over the spacer layer using one or more known vapor deposition processes. In exemplary embodiments, various NiFe alloys, CoFe alloys, amalgamations of these alloys, or any other ferromagnetic target material may be deposited using an IBD process in which a layer of ferromagnetic material having a thickness from about 10 angstroms to about 100 angstroms is formed directly over the spacer layer. Alternatively, a second-fabrication-barrier layer may be disposed between the second-ferromagnetic layer and the spacer layer, thereby separating the spacer layer from the second-ferromagnetic layer.

In forming the second-ferromagnetic layer, the exemplary IBD process parameters for depositing the first-ferromagnetic layer may be used. Moreover, the values for the IBD process parameters used in depositing an exemplary first-ferromagnetic layer may be used in depositing an exemplary second-ferromagnetic layer. For example, the ferromagnetic-layer-deposition pressure parameter for depositing a NiFe second-ferromagnetic layer may range from about 1.00E-05 Torr to about 4.00E-05 Torr. The values for the ferromagnetic-layer-deposition ion energy parameter may range from about 300 eV to about 1.1 KeV. Exemplary values for the ferromagnetic-layer-deposition ion-incident-angle may range from about 0 degrees to about 60 degrees. Like the rest of these parameters, the temperature range for the ferromagnetic-layer-deposition temperature parameter are generally known, and within these known values the temperatures may range from about 0 degrees C. to about 80 degrees C. The values of the IBD process parameters for forming the second-ferromagnetic layer may vary from those presented, and alternative or additional process parameters may be included.

As shown in block 360, forming an antiferromagnetic layer over the second-ferromagnetic layer may cause the GMR senor element to behave as a "spin-valve," where the magnetic moment (or moments) of the first-antiferromagnetic layer is free to spin in the presence of an external magnetic field. Such a layer may be formed using known vapor deposition processes, such as CVD and PVD. Various FeMn alloys, IrMn alloys, PtMn alloys, amalgamations of these alloys, or any other antiferromagnetic target material may be deposited using an IBD process. The IBD process using an essentially pure FeMn target may produce an exemplary FeMn antiferromagnetic layer having a thickness ranging from about 70 angstroms to about 150 angstroms. While a third-buffer or fabrication-barrier layer may be formed between the second-ferromagnetic layer and the antiferromagnetic layer, an exemplary GMR sensor element may be formed when the antiferromagnetic layer is formed directly over the second-ferromagnetic layer.

In forming the antiferromagnetic layer over the second-ferromagnetic layer, in addition to the parameters discussed below, known IBD process parameters may also be used. Moreover, in addition to the values for the IBD process parameters used in depositing an exemplary antiferromagnetic layer describe below, other values may also be used. Resembling the IBD process parameters for depositing the first-ferromagnetic and second-ferromagnetic layer, the IBD process parameters for depositing the antiferromagnetic-layer may include (i) an antiferromagnetic-layer pressure parameter, (ii) an antiferromagnetic-layer-deposition ion energy parameter, (iii) an antiferromagnetic-layer-deposition-ion-incident-angle parameter, and (iv) an antiferromagnetic-layer-deposition temperature parameter.

Exemplary values for each of these process parameters may be as follows. The values for the antiferromagnetic-layer pressure parameter range from about 1.00E-05 Torr to about 4.00E-04 Torr. The antiferromagnetic-layer-deposition ion energy parameter may range from about 300 eV to about 1.1 KeV. The ferromagnetic-layer-deposition-ion-incident-angle may range from about 0 degrees to about 60 degrees. The temperature for the ferromagnetic-layer-deposition temperature parameter may range from about 0 degrees C. to about 80 degrees C.

While FIG. 3 illustrates exemplary functions for carrying out a method of manufacturing a GMR sensor element, other known steps and functions may be performed. These functions are for illustration purposes only and not necessarily intended to limit the scope of the present embodiments, provide sequential processing steps, or provide an inflexible fabrication recipe. As an example, an annealing function or process may be performed between carrying out each of the functions described above or after all the layers are formed. It is believed that this function of annealing the layers may enhance the antiferromagnetic and ferromagnetic coupling between the ferromagnetic layers of the GMR sensor element, because defects in the GMR sensor element's layers are smoothed out, or minimized.

5. Experimental Results

Figure 4:
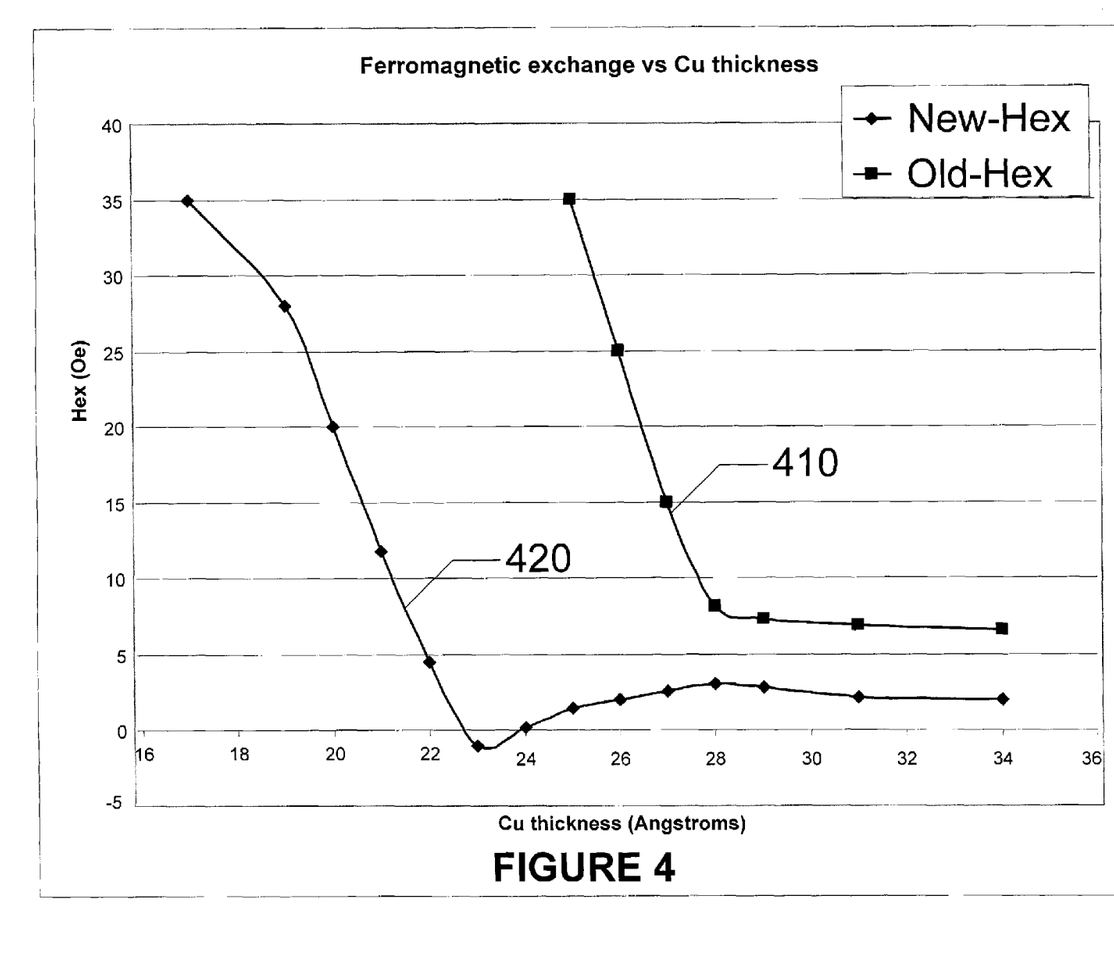
FIG. 4 is a chart illustrating the exchange coupling between the magnetic layers of a giant magnetoresistive sensor element according to an exemplary embodiment.

FIG. 4 is a chart illustrating the exchange coupling, exchange bias, or "$H_{EX}$" between the first-ferromagnetic layer 118 and the second-ferromagnetic layer 124 for different thicknesses of spacer layer 120 in a GMR sensor element. The construction GMR sensor element that provided the experimental results of the $H_{EX}$ shown in FIG. 4 included a first-ferromagnetic layer and a second-ferromagnetic layer fabricated from FeMn, and a spacer layer fabricated from copper. As shown in FIG. 4, the old-$H_{EX}$ curve 410 illustrates the $H_{EX}$ between the first-ferromagnetic layer 118 and the second-ferromagnetic layer 124 for different thicknesses of the spacer layer 120 in a pinned GMR sensor element (spin valve) without the buffer-oxide layer 114.

The new-$H_{EX}$ curve 420 illustrates the $H_{EX}$ between the first-ferromagnetic layer 118 and the second-ferromagnetic layer 124 for different thicknesses of the spacer layer 120 in a pinned GMR sensor element (spin valve) deployed with a buffer-oxide layer 114. The buffer-oxide layer that produced the exemplary results illustrated by new-$H_{EX}$ curve 420 was fabricated from a FeMnO layer having a thickness ranging from about 2 angstroms to about 20 angstroms. Further, in producing these results, the GMR sensor element (with or without the buffer-oxide layer) was not subjected to an annealing process.

The old-$H_{EX}$ curve 410 shows that below a thickness of about 28 angstroms of a Cu spacer layer, the $H_{EX}$ or amount of external magnetic field to overcome the ferromagnetic coupling between the magnetic layers differs from that of the new-$H_{EX}$ curve 420. For instance, for a Cu spacer layer 120 at a thickness of about 26 angstroms, the $H_{EX}$ is about 25 oersted (Oe). At this $H_{EX}$, the working range of the GMR sensor element is shifted upwards by about 25 Oe, which reduces the MR resistivity sensitivity to magnetic fields over about 25 Oe. The loss in MR resistivity sensitivity or shift in the working range may be confirmed by visual and mathematical inspection of the old-$H_{EX}$ curve 410, which appears to illustrate the exponential decay of the $H_{EX}$ commensurate with the situation where Néel-type-orange-peel coupling dominates RKKY coupling as the spacer layer 120 becomes thinner.

On the other hand, new-$H_{EX}$ curve 420 shows no such exponential Néel-type-orange-peel coupling dominating the RKKY coupling at thicknesses below about 23 angstroms. Rather, the new-$H_{EX}$ curve 420 illustrates a fit between the Néel-type-orange-peel coupling and RKKY coupling, such that below 23 angstroms (as well as above 23 angstrom) the $H_{EX}$ remains substantially constant. Accordingly, the working range of the GMR sensor element is not reduced by the dominating exponential-Néel-type-orange-peel coupling.

Such fit between the RKKY coupling and the Néel-type orange peel coupling may be provided by a first order approximation of a coupling coefficient equation of:

$$J = \frac{J_0}{t_{cu}^2} \sin\left(\frac{2\pi \cdot t_{cu}}{\lambda} + \phi\right) + \frac{\pi^2}{\sqrt{2}} \frac{h^2}{\lambda}(\mu_0 M \times M') \exp^{\frac{-2\pi\sqrt{2t_{cu}}}{\lambda}}, \quad (1)$$

where $t_{Cu}$ is the thickness of a copper spacer layer, λ relates to the wavelength (i.e. waviness or smoothness) for RKKY coupling, φ represents a phase term, h relates to the wavelength (i.e. waviness or smoothness) for Néel-type orange peel coupling, and $J_0$ relates to inherent RKKY coupling. The first order coupling approximation may be expressed as:

J≈[RKKY-coupling term]+[Néel-type-orange-peel-coupling term], which equals:

$$J \approx A/t_{cu}^2 \times \sin(0.465 \times t_{cu}) + B\exp^{(-2\pi\sqrt{2t_{cu}}/h)} \quad (2)$$

where $t_{Cu}$ is the thickness of a copper spacer layer, λ relates to the wavelength (i.e. waviness or smoothness) for RKKY coupling, φ represents a phase term, h relates to the wavelength (i.e. waviness or smoothness) for Néel-type orange peel coupling, and A and B are constants. The values of the parameters used for the fit included $t_{Cu}$=54 angstroms, λ=7, h=155 angstroms, A=7000, and B=60. These values were also chosen to dampen both the RKKY coupling and the Néel-type-orange-peel-coupling, and to shift the ferromagnetic/antiferromagnetic oscillations to primarily ferromagnetic coupling. The values of the parameters used for the fit, however, may be varied.

Figure 5:
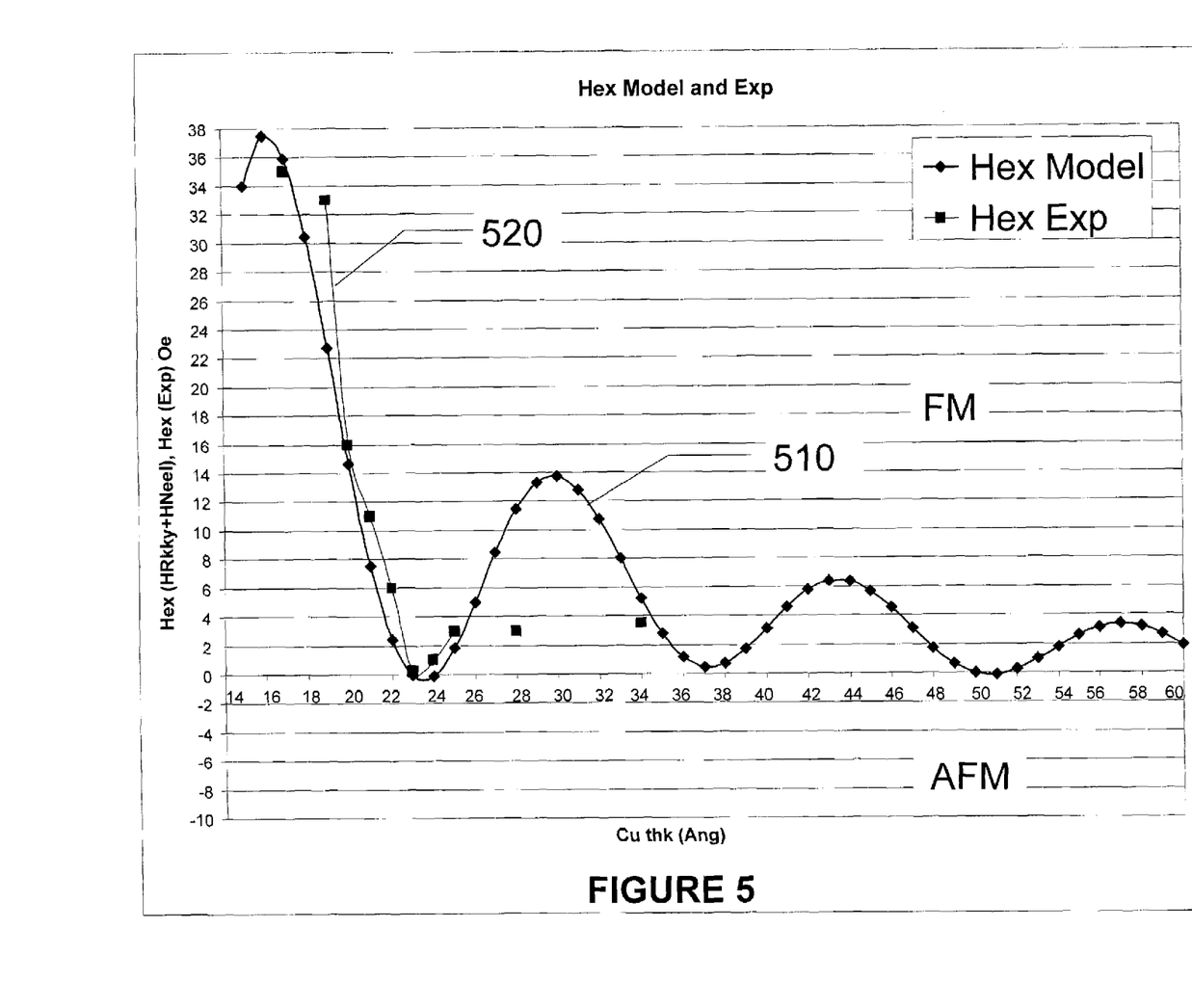
FIG. 5 is a chart illustrating the ferromagnetic exchange coupling oscillations between the magnetic layers of a giant magnetoresistive sensor element according to an exemplary embodiment.

FIG. 5 is a chart illustrating the ferromagnetic exchange coupling oscillation between the first-ferromagnetic layer 118 and the second-ferromagnetic layer 124 for different thicknesses of spacer layer 120 in a GMR sensor element. The construction of GMR sensor element that provided the experimental results of the $H_{EX}$ shown in FIG. 5 included a first-ferromagnetic layer and a second-ferromagnetic layer fabricated from FeMn, and a spacer layer fabricated from copper. As shown in FIG. 5, the Hex-Model curve 510 illustrates the theoretical oscillations between the antiferromagnetic coupling and ferromagnetic coupling between the first-ferromagnetic layer 118 and the second-ferromagnetic layer 124 at various $H_{EX}$ (in Oe) values for different thicknesses of the spacer layer 120 in a pinned GMR sensor element (spin valve) with the buffer-oxide layer 114. The theoretical oscillations illustrated by the Hex-Model curve 510 were produced assuming a buffer-oxide layer that was fabricated from a FeMnO layer having a thickness ranging from about 2 angstroms to about 20 angstroms.

The Hex-Model curve 510 may be derived from the first order equation using both the RKKY term and the Néel term, and thus, the Hex-Model curve 510 includes both an RKKY-coupling component and a Néel-type-orange-peel-coupling component. In the Hex-Model curve 510, the RKKY-coupling component dominates the Néel-type-orange-peel-coupling component. The Hex-Exp curve 520 illustrates the measured oscillations between the antiferromagnetic coupling and ferromagnetic coupling for the first-ferromagnetic layer 118 and the second-ferromagnetic layer 124 at various $H_{EX}$ values for different thicknesses of the spacer layer 120 in a pinned GMR sensor element (spin valve) with the buffer-oxide layer 114. To compare the theoretical oscillations to measured oscillations, the buffer-oxide layer used in the experiment matched the assumption of the model presented by the Hex-Model curve 510. The buffer-oxide layer was fabricated from FeMnO having a thickness ranging from about 2 angstroms to about 20 angstroms. As above, in producing these results, the GMR sensor element with or without the buffer-oxide layer was not subjected to an annealing process.

Notably, the Hex-model curve 510 and the Hex-Exp curve 520 closely fit. This close fit suggests that the RKKY-coupling component and the Nëel-type-orange-peel-coupling component (i.e. the RKKY-coupling term and the Nëel-type-orange-peel-coupling term of the first order approximation equation) are present, but the RKKY coupling (and RKKY term) dominates the Nëel-type orange peel coupling (and the Nëel-type-orange-peel-coupling term).

The Hex-Exp curve 520 contains several periods of ferromagnetic coupling (with minor excursions into antiferromagnetic coupling) for various copper spacer layer thicknesses. Each of these periods has a peak. While the Hex-Exp curve 520 begins at thickness of about 20 angstroms for the spacer layer, the Hex-Exp curve 520 suggests that at thicknesses below about 23 angstroms a large GMR effect may be exhibited without the detrimental effects of the Nëel-type-orange-peel coupling.

Figure 6:
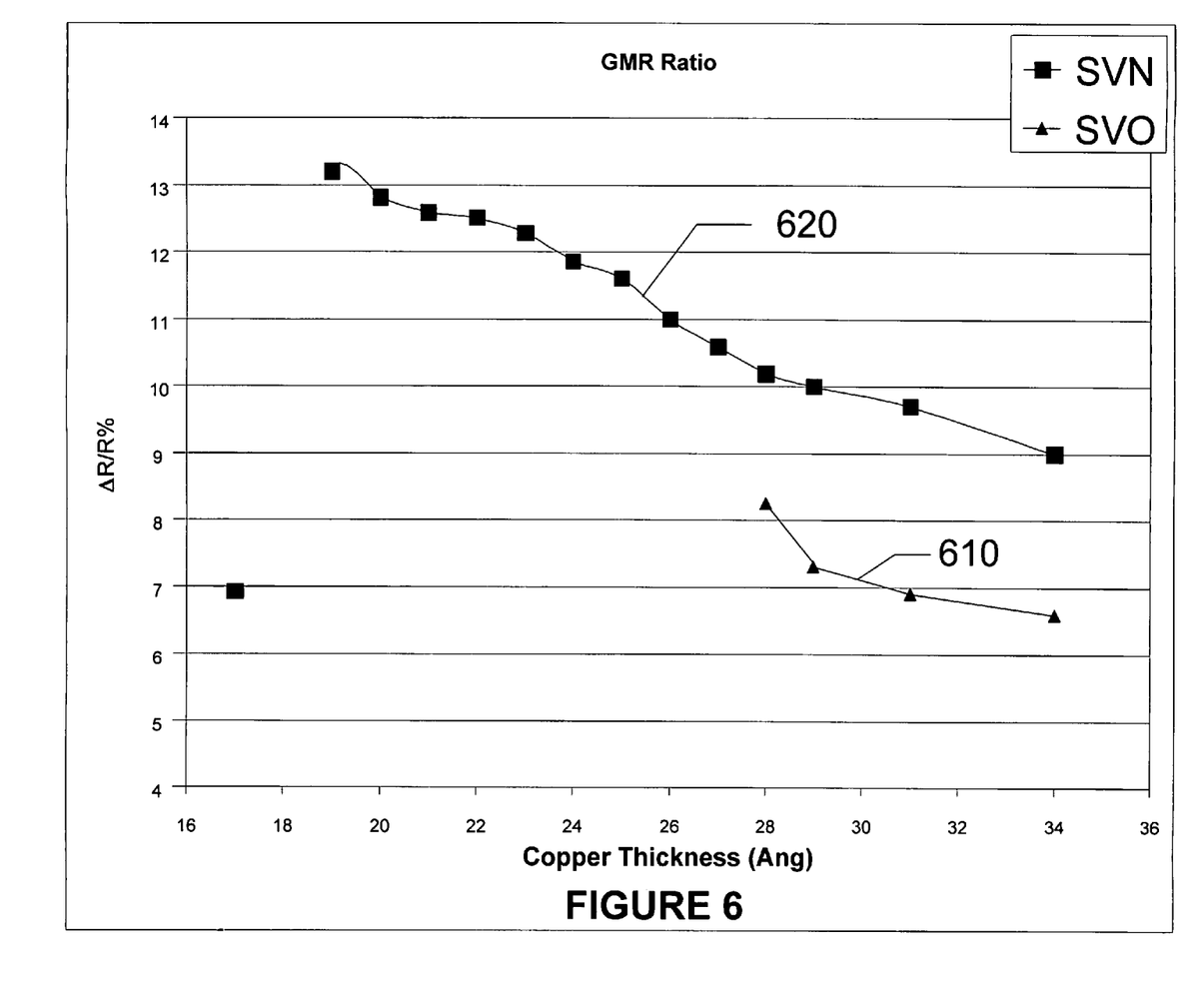
FIG. 6 is a chart illustrating the GMR ratio of a GMR-sensor element according to an exemplary embodiment.

FIG. 6 is a chart illustrating the GMR ratio ($\Delta R/R\%$) for different thicknesses of spacer layer 120 in a GMR sensor element. The construction of the GMR sensor element that provided the experimental results of the GMR ratio ($\Delta R/R\%$) shown in FIG. 6 included a first-ferromagnetic layer and a second-ferromagnetic layer fabricated from FeMn, and a spacer layer fabricated from copper.

As shown in FIG. 6, the SVO curve 610 illustrates the GMR ratio ($\Delta R/R\%$) for different thicknesses of the spacer layer 120 in a pinned GMR sensor element (spin valve) without the buffer-oxide layer 114. The SVN curve 620 illustrates the GMR ratio ($\Delta R/R\%$) for different thicknesses of the spacer layer 120 in a pinned GMR sensor element (spin valve) with the buffer-oxide layer 114 in which the buffer-oxide layer was fabricated from a FeMnO layer having a thickness ranging from about 2 angstroms to about 20 angstroms. The exemplary results shown in curves SVO curve 610 and SVN curve 62 are provided by a GMR sensor element that was not exposed to an annealing process.

SVN curve 620 illustrates large GMR ratios ($\Delta R/R\%$) at thin spacer layers. As indicated in the table below, for spacer layer thicknesses ranging from about 19 angstroms to about 34 angstroms the GMR sensor element provide exemplary GMR ratios ranging from about 13.2% to about 9%. As also shown in Table I. below and illustrated in the SVO curve 610, at spacer layer thicknesses above about 28 angstroms, the GMR sensor exhibits substantially less GMR ratio; thus the MR resistivity sensitivity of the GMR sensor element without the buffer-oxide layer may be substantially less than a GMR sensor element with the buffer-oxide layer. Note that, for spacer layer thickness below about 28 angstroms the GMR effect is relatively attenuated.

TABLE I

| Cu Thk (angstrom) | Hon Old SV ($\Delta R/R$ %) | Hon New SV ($\Delta R/R$ %) |
|---|---|---|
| 19 | — | 13.2 |
| 20 | — | 12.82 |
| 21 | — | 12.6 |
| 22 | — | 12.51 |
| 23 | — | 12.28 |
| 24 | — | 11.86 |
| 25 | — | 11.6 |
| 26 | — | 11 |
| 27 | — | 10.6 |
| 28 | 8.2 | 10.2 |

TABLE I-continued

| Cu Thk (angstrom) | Hon Old SV ($\Delta R/R$ %) | Hon New SV ($\Delta R/R$ %) |
|---|---|---|
| 29 | 7.3 | 10 |
| 31 | 6.9 | 9.7 |
| 34 | 6.6 | 9 |

In view of the wide variety of embodiments to which the principles of the present invention can be applied, it should be understood that the illustrated embodiments are exeplary only, and should not be taken as limiting the scope of the present invention. For example, the steps of the flow diagrams may be taken in sequences other than those described, and more or fewer elements may be used in the block diagrams. Further, the orientation of the layers may be located differently from that presented. The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

Preferred and alternative embodiments of the present invention have been illustrated and described. A buffer-oxide layer having a cross-section of about 2 to 100 angstroms may produce desirable texturing or substantially smooth interfaces between the first-ferromagnetic layer and the spacer layer, and between the spacer layer and the second-ferromagnetic layer. It is believed that this buffer-oxide layer reduces the Nëel-type orange peel coupling between the first-ferromagnetic layer and the second-ferromagnetic layer. Moreover, the smooth interfaces and the reduced ferromagnetic coupling may allow implementing very thin spacer layers, and thus, may increase the magnetoresistive (MR) resistivity sensitivity, reduce ferromagnetic exchange shifts, and produce high sheet resistances. Further, the buffer-oxide layer may also provide specular scattering of elections at the boundaries of the first-ferromagnetic and second-ferromagnetic layers, possibly forming an electron waveguide.

The composition of the GMR device described above provides common elements that may be used in various GMR sensors, such as unpinned sandwich GMR sensors and/or magnetic memories, such as Magnetic Random Access Memory (MRAM). By further including a first-antiferromagnetic layer in the composition, the GMR device may be deployed as (i) top and bottom spin-valve magnetoresistive sensor elements, (ii) synthetic antiferromagnetically biased giant magnetoresistive sensor elements, (iii) spin filter giant magnetoresistive sensor elements, (iv) filter synthetic antiferromagnetically biased giant-magnetoresistive sensor elements, and/or (v) other antiferromagnetically exchanged-biased (or "pinned-layer") GMR sensor elements.

These and other GMR device sensor elements may be beneficially deployed as read/write heads for direct access storage devices, such as disk drives; as sensors in transduction applications, such as navigational sensors, traffic control switches, proximity sensors; and in a multitude of other uses.

It will be understood, however, that changes and modifications may be made to the invention without deviating from its true spirit and scope, as defined by the following claims.

What is claimed is:

1. A giant magnetoresistive (GMR) device comprising:
a substrate;
a seed layer formed over the substrate;

a buffer-oxide layer formed over the seed layer, wherein the buffer-oxide layer has a thickness of greater than 50 angstroms and less than 100 angstroms, and wherein the buffer-oxide layer comprises a ferromanganese oxide;

a first-ferromagnetic layer formed over the buffer-oxide layer;

a spacer layer formed over the first-ferromagnetic layer; and a second-ferromagnetic layer formed over the spacer layer.

2. The GMR device of claim 1, wherein the buffer-oxide layer is configured to prevent Néel-type-orange-peel coupling from dominating RKKY coupling in the GMR device.

3. The GMR device of claim 1, wherein the relative thickness of the buffer-oxide layer to the spacer layer produces a giant magnetoresistive effect from about 7% to about 15% ΔR/R.

4. The GMR device of claim 1, wherein the spacer layer has a thickness of about 16 angstroms to about 60 angstroms.

5. The GMR device of claim 1, wherein locating the buffer-oxide layer over the seed layer and under the first-ferromagnetic layer produces a first substantially smooth interface between the first-ferromagnetic layer and the spacer layer.

6. The GMR device of claim 5, wherein locating the buffer-oxide layer over the seed layer and under the first-ferromagnetic layer produces a second substantially smooth interface between the spacer layer and the second-ferromagnetic layer.

7. The GMR device of claim 1 wherein the spacer layer has a thickness of about 16 angstroms to about 60 angstroms, and whereby the GMR device provides a magnetic sensitivity from about 5 Oe to about 1 k Oe.

8. The GMR device of claim 7, wherein the spacer layer has a thickness of about 16 angstroms to about 23 angstroms, and wherein the first-ferromagnetic layer ferromagnetically couples with the second-ferromagnetic layer from about 35 Oe to about 0 Oe.

9. The GMR device of claim 1, whereby the buffer-oxide layer provides for a first smooth interface between the first-ferromagnetic layer and the spacer layer.

10. The GMR device of claim 9, whereby the buffer-oxide layer provides for a second smooth interface between the spacer layer and the second-ferromagnetic layer, wherein the spacer layer has a thickness of about 16 angstroms to about 60 angstroms, and whereby the GMR device provides a giant magnetoresistive effect from about 7% to about 15% ΔR/R.

11. The GMR device of claim 1, whereby the buffer-oxide layer provides for a second smooth interface between the spacer layer and the second-ferromagnetic layer.

12. The GMR device of claim 1, further comprising an antiferromagnetic layer formed over the second-ferromagnetic layer, wherein the second-ferromagnetic layer ferromagnetically couples with the antiferromagnetic layer.

13. The GMR device of claim 12, wherein the spacer layer has a thickness of about 16 angstroms to about 60 angstroms.

14. The GMR device of claim 12, wherein the relative thickness of the buffer-oxide layer to the spacer layer produces a giant magnetoresistive effect from about 7% to about 15% ΔR/R.

15. The GMR device of claim 12, wherein the buffer-oxide layer is configured to prevent Néel-type-orange-peel coupling from dominating RKKY coupling in the GMR device.

16. The GMR device of claim 12, wherein the spacer layer has a thickness of about 16 angstroms to about 60 angstroms, whereby the GMR device provides a magnetic sensitivity from about 5 Oe to about 1 k Oe.

17. The GMR device of claim 16, wherein the spacer layer has a thickness of about 16 angstroms to about 60 angstroms, and wherein the first-ferromagnetic layer ferromagnetically couples with the second-ferromagnetic layer from about 35 Oe to about 0 Oe.

18. The GMR device of claim 12, whereby the buffer-oxide layer provides a first smooth interface between the first-ferromagnetic layer and the spacer layer.

19. The GMR device of claim 18, whereby the buffer-oxide layer provides a second smooth interface between the spacer layer and the second-ferromagnetic layer, and wherein the spacer layer has a thickness of about 16 angstroms to about 60 angstroms, and whereby the GMR device provides a giant magnetoresistive effect from about 7% to about 15% ΔR/R.

20. The GMR device of claim 12, wherein the buffer-oxide layer provides a second smooth interface between the spacer layer and the second-ferromagnetic layer.

21. The GMR device of claim 1, wherein the seed layer is deposited directly on the substrate, the buffer-oxide layer is deposited directly on the seed layer, the first ferromagnetic layer is deposited directly on the buffer-oxide layer, the spacer layer is formed directly on the first ferromagnetic layer, and the second ferromagnetic layer is formed directly on the spacer layer.

* * * * *